United States Patent [19]
Cusick et al.

[11] Patent Number: 5,199,101
[45] Date of Patent: Mar. 30, 1993

[54] ON THE FLY IMAGE ROTATION SYSTEM FOR HIGH-SPEED PRINTERS

[75] Inventors: Daniel V. Cusick, Chesterland; Michael A. Chmura, Willoughby Hills; Raymond G. Molnar, Boston Heights, all of Ohio

[73] Assignee: Bell & Howell Publication Systems Company, Wooster, Ohio

[21] Appl. No.: 592,186

[22] Filed: Oct. 3, 1990

[51] Int. Cl.$^5$ .......................................... G06K 15/00
[52] U.S. Cl. ..................................... 395/115; 340/727
[58] Field of Search ............... 395/137, 101, 106, 108, 395/162, 164, 165, 166, 138, 117, 115, 116, 114; 340/750, 727, 798, 799; 346/1.1, 154; 358/261.3, 261.4, 296, 78

[56] References Cited

U.S. PATENT DOCUMENTS

| | | | |
|---|---|---|---|
| 4,168,488 | 9/1979 | Evans | 395/137 |
| 4,303,986 | 12/1981 | Lans | 364/900 |
| 4,467,448 | 8/1984 | Regehr et al. | 395/137 |
| 4,635,212 | 1/1987 | Hatazawa | 364/518 |
| 4,716,544 | 12/1987 | Bartley | 364/900 |
| 4,727,497 | 2/1988 | Peters et al. | 364/318 |
| 4,841,453 | 6/1989 | Finlay et al. | 364/519 |
| 4,843,405 | 6/1989 | Morikawa et al. | 346/1.1 |
| 4,918,624 | 4/1990 | Moore et al. | 364/519 |
| 4,931,960 | 6/1990 | Morikawa | 364/519 |

Primary Examiner—Arthur G. Evans
Attorney, Agent, or Firm—Fay, Sharpe, Beall, Fagan, Minnich & McKee

[57] ABSTRACT

An image is stored in raster format having N raster or data lines each with M pixel values in an image or print buffer memory (10). An addressing circuit (20) addresses the print buffer memory to read out m×n bit columns or blocks of data, where n=N unless cropping of the image is desired. The blocks are parallel loaded alternately into a first FIFO memory array (40) and a second FIFO memory array (62). Each FIFO memory array includes a plurality of FIFO memories (42a-p 64a-p) which store n data lines segments each of m/p bits. In the first n clock cycles of the first FIFO memory (42a), a multiplexer (46) passes the least significant bit (50) of each data line segment read out of the first FIFO memory. The next N times that the first FIFO memory is clocked, the multiplexer passes the next least significant bit and so on until all m/p bits have been passed serially to a laser printer (48). Thereafter, this process is repeated for a second FIFO memory (42b) and each successive one of the p FIFO memories of the first array. After the data in the first array has been serialized, the data in the second FIFO array (62) is serialized as another m×n bit column of data is loaded into the first FIFO memory array (40). In this manner, data is serialized and passed to the laser printer (48) in an order which causes data from a horizontal raster line image to be printer along orthogonal data columns (54, 56) on the fly.

18 Claims, 1 Drawing Sheet

ON THE FLY IMAGE ROTATION SYSTEM FOR HIGH-SPEED PRINTERS

BACKGROUND OF THE INVENTION

The present invention relates to the data processing arts. It finds particular application in conjunction with a 90° change in orientation of image data between an image or print memory and a high-speed printer and will be described with particular reference thereto. It is to be appreciated, however, that the invention will also find application in the rotation of bit map data for display and other purposes.

Heretofore, image data manipulation systems have been created which enable data to be printed in either a portrait format (long edge of the paper vertical) or a landscape format (long edge of the paper horizontal). Typically, images to be printed are stored with an organization dedicated to one of these formats. Printing the data in the other format requires rotating the image 90°.

Data stored in a bit map in a first print or image memory has been operated upon by a transform operation as it moves from the first image memory into a second image memory. More accurately, the data addresses were transformed such that as the data is transferred to memory cells in the second memory, the stored image is 90° rotated relative to the image in the first. Although a 90° rotation is most common, transforms are readily selectable which would rotate the data through any arbitrary angle. When the entire bit map had been rotated and stored in the second image or print memory, the data was transferred to the printer. See, for example, U.S. Pat. No. 4,841,453 to Finlay.

A primary drawback of rotating or otherwise transforming the data as it is moved from one image memory to another is its slowness. The print operation cannot begin until the transformation and movement of data is completed. Thus, after every sheet is printed, the printer must be stopped while the data of the next image is transformed and moved between the memories. Another drawback of this system is in the hardware overhead. Two image memories, typically VRAM's, are required. In high-resolution printing in which there are 300 bits per inch in each direction, large image memories and long transform times have been required. These common problems are compounded in larger sized drawings, such as a B size drawing which is twice the size of a conventional A size letter page or a C size drawing which is twice the size of a B size drawing.

It might be noted that in word processing applications, letter information is communicated by fonts. To perform the 90° rotation, the font or bit map representing each letter must be rotated 90° and the position of the font on the sheet must be transformed. This creates a more complex transformation procedure which tends to slow the transfer of image data between the two memories. See, for example, U.S. Pat. Nos. 4,931,960 and 4,843,405 to Morikawa, et al., and U.S. Pat. No. 4,635,212 to Hatazawa.

It has been recognized that expediting the transform operation would be advantageous. Expeditious data address transform techniques are disclosed in U.S. Pat. No. 4,716,544 to Bartley and U.S. Pat. No. 4,727,497 to Peters, et al.

The present invention contemplates a new and improved image data handling technique in which the address transformation and a full second memory buffer are eliminated.

SUMMARY OF THE INVENTION

In accordance with the present invention, a system is provided for preparing raster image data to print transversely to a raster direction. An addressing means causes $m \times n$ blocks of data to be read out of an $M \times N$ image memory. First and second FIFO memory means are alternately loaded with the $m \times n$ blocks of data. A serializing means alternately serializes the $m \times n$ blocks of data from the first and second FIFO memory means.

In one embodiment $n = N$ such that the full height of the image is serialized. In another embodiment $n < N$ such that the height of the image is cropped.

In accordance with a more limited aspect of the present invention, the first FIFO memory means includes at least one FIFO memory which is clocked to read out in parallel each of n rows of data and resets itself to start reading out the data rows again after the nth line has been read out. When each pixel is represented by a single bit, the serializing means includes a multiplexing means which passes a progressively less significant bit after every n lines are read out of the first FIFO memory.

In accordance with another aspect of the present invention, a system is provided for rotating image data lines stored in a raster format with N lines of data by 90°. A first FIFO memory means stores n partial data lines and a second FIFO memory means stores n other partial data lines. A first switching means alternately parallel loads n partial data lines into the first and second FIFO memory means. A serializing means passes a selectable pixel of each partial data line into a serial pixel stream. The serializing means is operatively connected with the first and second FIFO memory means to receive the parallel format partial data lines read out therefrom. A clocking means clocks a first of the FIFO memory means to read out the n partial data lines cyclically. After every nth partial data line is read out, one of the clocking means and the clocked FIFO memory means indexes the serializing means to pass a different pixel of each of the next n clocked-out partial data lines into the serial data stream.

In accordance with another aspect of the present invention, a method is provided for serializing raster image data which has N data lines. An $m \times n$ bit column, where m is a plural integer and n is an integer less than or equal to N, of image data is loaded into one FIFO memory means while rows of data are read out from a second FIFO memory means that was previously loaded with an $m \times n$ bit column of data. As each of n rows of data is read out from the second FIFO memory means, a most significant bit of each row is passed to a serial data output. The steps of reading out each of the n rows of data and passing only a next most significant bit are repeated m times.

In accordance with more limited aspect of the invention, after the last bit of each of the n data lines has been passed to the serial output, the second FIFO memory means is reloaded with another $m \times n$ bit column of image data and concurrently data previously loaded into the first FIFO memory means is serially read out.

In accordance with another aspect of the present invention, a method of serializing raster image data is provided. A preselected plurality of data line portions are parallel loaded into FIFO memories of a first FIFO memory array. A first FIFO memory of the first array is cyclically clocked to read out each of a first segment of the data line portions. Only a selected pixel position of each read out data line portion segment is passed to a serial output. The cyclic clocking and passing of a selected pixel position steps are repeated for each pixel position of the data line portion first segment. Thereafter, the steps are repeated for each subsequent FIFO memory of the first FIFO memory array. Concurrently with the performance of these steps on the first FIFO memory array, subsequent data line portions are parallel loaded into FIFO memories of a second FIFO memory array. After the data in the first FIFO memory array has been passed to the serial output in this manner, the same process is repeated on the data in the second FIFO memory array as the FIFO memories of the first array are reloaded with more data line portions.

One advantage of the present invention is that it effectively rotates image data on the fly.

Another advantage of the present invention is that it supplies image data fast enough to keep up with a high-speed laser printer.

Another advantage of the present invention is that it eliminates complex and timely address transforms and a second image or print memory.

Still further advantages of the present invention will become apparent upon reading and understanding the following detailed description.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figures 1, 2:
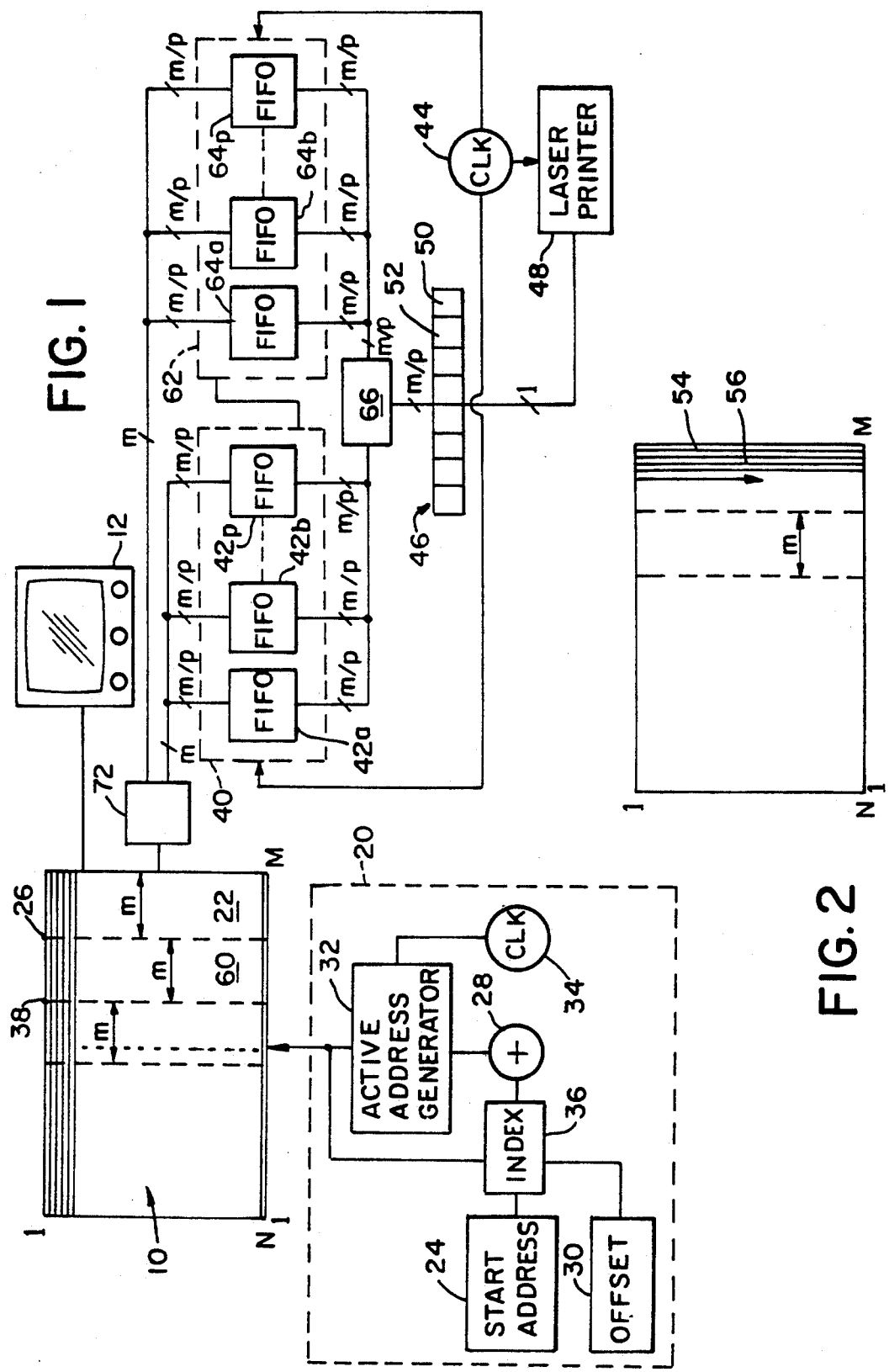
FIG. 1 is a diagrammatic illustration of an image data handling system in accordance with the present invention.
FIG. 2 is a diagrammatic illustration of the printing of the data.

With reference to FIG. 1, an image memory or print buffer 10 stores N lines of image data in packed raster format. Each line stores data bits indicative of a gray scale value for each of M pixels. Each pixel may be represented selectively by one or more bits of data. For example, if each pixel is limited to black or white, only a single bit describes each pixel. With two bits of data for each pixel, the data may assume any of four gray scale levels, typically black, white, and two intermediate shades of gray.

For purposes of illustration, the image stored in the image memory 10 is B size drawing, i.e. 11"×17", stored in a landscape mode and has a pixel density of 300 pixels per linear inch. Thus, the drawing has about 3,300 lines of data, each line representing 5,100 pixels. For simplicity of illustration and because many laser printers only print black or white, the pixels of the preferred embodiment are each a single bit. That is, each raster data line has 5,100 bits of data.

When the image data in the image memory 10 is displayed on a video monitor 12, the raster data lines are read out serially. This supplies the data to the video monitor in the proper order for a conventional horizontal raster scan video monitor to display the image in the landscape format. If data were supplied in this same serial order to a laser printer, then the laser printer would need to have a print sweep of 17 inches. Note that if the data were read out perpendicular to the raster sweep direction, vertically as illustrated in FIG. 1, then the data could be fed to a laser printer that has only an 11 inch print sweep, a much less expensive printer.

When feeding the data to a laser printer, the data stream must be clocked at the same clocking rate as the laser printer and fed continuously. In laser printers, the laser beam moves continuously and does not stop between print lines, i.e. it is free-wheeling. If the data of the next line is not available within a predefined retrace time after the completion of the preceding line, the printer will be starved for data, but the laser beam will not stop. When the data for the next line finally reaches the laser printer, the laser beam will have moved partially across its next sweep shifting the data accordingly. When the printer reaches the end of the sweep, the left-over data from the current data line will be carried over to the next sweep. This, of course, creates print errors and distortions in the data.

An address generator means 20 generates addresses in the memory 10 for reading out an m×n column or block of data 22. In the preferred embodiment, m is 32 bits of packed data, which corresponds to 32 pixels in a one bit per pixel format, 16 pixels in a two bits per pixel format, etc. and n=N. However, the image can be cropped or only a window of the image printed by using a column height n that is less than the full image height N. The address generating means 20 is hardware based to read the data out more quickly. A start address means 24 indicates a starting address 26 for a first block of data, particularly the last m bits of data in each row, i.e. a 32 bit portion of each data line. A combining means 28 combines the starting address with an address offset from an address offset means 30 to index the starting point for each subsequent line to an address directly below address 26. An active address generating means 32 is controlled by a clock 34 for clocking the addresses from the combining means to the image memory 10 at a rapid rate to address and read out m bits in parallel. In the next clock cycle, the line address is incremented or indexed and the last m bits of the second line are read out in parallel. After the block 22 is transferred, the address generator 32 indexes an indexing means 36 which indexes the starting address back m bits to address 38. In this manner, the next m bit column or m×n bit block is read out.

The read out block or column of image data 22 is loaded in parallel into a first FIFO memory array or means 40 that stores an m×n array of data. The FIFO memory means includes p parallel FIFO memories, 42a, 42b, . . . , 42p, (four 8×N memories in the preferred embodiment). That is, each m bit data line portion from the image memory is divided and stored as p m/p bit data line segments, one segment in each of the p FIFO memories. The FIFOs are self-addressing such that each time a FIFO is clocked, the next data line segment is read out. The FIFO memory means 40 is clocked by a clocking means 44 to feed an m/p bit data line segment from the first FIFO memory 42a to a serializing means 46 for serializing the data on to a serial output which conveys the serial data to a laser printer 48.

The serializing means 46, in the one bit per pixel embodiment, includes an m/p:1 multiplexing means (8:1 in the preferred embodiment) that passes a last or most significant bit 50 of the m/p bits received from the first FIFO memory 42a in each of the first n clock cycles. After the nth clock cycle, the FIFO resets itself to start with the first line of data again and indexes the multiplexer 46 such that it passes only the second most significant bit 52 for each of the next n clock cycles. If the image data is in two bit per pixel format, the serializing means passes two bits in parallel.

In the embodiment illustrated in FIG. 2 in which n=N, in the first N clock cycles, the N pixel values of a last vertical column 54 of pixels of the image is serially fed to the laser printer 48. In the second N clock cycles, a second to last column 56 of data is transferred serially to the laser printer.

After m/p cycles, the FIFO memory 42a resets the multiplexing means 46 back to the most significant bit and starts the second FIFO memory 42b. The same procedure is repeated with the data from the second FIFO memory 42b serially passing each of the most significant bits of the N readout data line segments, the next most significant bits, and so on. After the m/pth pass through the second FIFO memory 42b, the second FIFO memory 42b starts the next FIFO memory and reinitializes the multiplexing means 46, etc.

While the data was being clocked from the first FIFO memory means 40 and serialized by the serializing means 46, the addressing means 20 continues addressing a second block or column of data 60 of the image or print memory means 10. The second column of data is loaded into a second FIFO memory means 62 having the same construction and operation as the first FIFO memory means 40.

After the last FIFO memory 42p finishes its m/pth repetition, its reset signal starts a first FIFO memory 64a of the second FIFO memory means 62, resets the multiplexer 46, and causes a switching means 66 to connect the serializing means with the second FIFO memory means 62. The reset signal from the last FIFO memory 42p also reinitializes the address means 20 to start reading out a third column of data 70 from the image or print memory 10. This reset signal also controls a switching means 72 to cause the read out data to be loaded in parallel into the first FIFO memory means 40 as the data from the second FIFO memory means 62 is serially read out to the laser printer 48.

This process of alternately moving columns of data into one of the FIFO memory means as data from the other is serialized and communicated to the laser printer is cyclically repeated. It should be noted that after the last column of data is transferred from the image or print memory 10 to one of the FIFO memory means, there is still more than m×N bits of data yet to be printed. This provides time for a second image to be parallel loaded into the print or image memory 10. This enables large images to be printed continuously, without pause, with only a single print or image buffer memory.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A system for concurrently displaying of M×N pixel images from raster image data read out in a raster direction and printing the read out raster image data transversely to the raster direction, the system comprising:

an M×N image memory means from which rows of image data are read out and displayed in the raster direction;

first and second FIFO memory means for alternately receiving m×N columns of the read out image data;

an addressing means for causing m×N columns of image data read out from the M×N image memory means to be supplied alternately to the first and second FIFO memory means;

a serializing means for alternately serializing the m×N columns of data from the first and second FIFO memory means and feeding the serialized data to a printer, where m is a plural integer that is equal to or less than M/2.

2. The system as set forth in claim 1 wherein the first FIFO memory means includes at least one FIFO memory which is clocked to read out in parallel each of N lines of data, the FIFO memory resetting itself to read out the N lines of data a plurality of times.

3. The system as set forth in claim 2 wherein the serializing means includes a multiplexing means for passing one pixel of data for each of the N lines of data, the multiplexing means being indexed each time the FIFO memory is reset to pass a different pixel after each reset.

4. The system as set forth in claim 2 wherein each pixel is represented by one bit and wherein the serializing means includes a multiplexing means for passing a progressively less significant bit after every N lines.

5. The system as set forth in claim 2 wherein the FIFO memory means includes p FIFO memories, each FIFO memory storing an m/p×M array of data, a clock means for clocking the FIFO memories such that each clock cycle causes a first of the FIFO memories to read out a next m/p line of data until all N lines of data have been read out, after the Nth line of data has been read out, the FIFO memory issuing a reset signal to reset itself such that the N lines of data are read out again starting with the next clock pulse, where p is an integer and m an even multiple of p.

6. The system as set forth in claim 5 wherein the serializing means includes a multiplexing means which receives m/p bits of data from the first FIFO memory means and passes bits of data corresponding to a selectable one pixel of data, the multiplexing means being indexed by the first FIFO reset pulse to index the bits which are passed.

7. The system as set forth in claim 5 wherein the FIFO memory means further includes a second FIFO memory which is enabled by an m/pth reset pulse of the first FIFO memory to commence cyclically reading out its data lines, the second FIFO memory indexing the mutliplexing means after N data lines are read out.

8. The system as set forth in claim 5 wherein the second FIFO memory means includes at least a second FIFO memory which is loaded while the first FIFO memory is reading out data to the serializing means.

9. The system as set forth in claim 5 further including a switching means for connecting the second FIFO memory means with the serializing means and for enabling the first FIFO memory means to be reloaded with another m×N column of data while data from the second FIFO memory means is serialized by the serializing means.

10. The system as set forth in claim 1 further including a switching means for connecting the second FIFO memory means with the serializing means and for enabling the first FIFO memory means to be reloaded with another m×N column of data while data from the second FIFO memory means is serialized by the serializing means.

11. A system for rotating image data by 90° on-the-fly as the image data is read from an image memory means in which the image data is stored in raster format with N lines of data, the system comprising:
- a first FIFO memory means for storing a partial data lines received from the image memory means, where n is an integer equal to or less than N;
- a second FIFO memory means for storing n other partial data lines received from the image memory means;
- a first switching means for alternately parallel loading groups of n partial data lines from the image memory means into the first and second FIFO memory means;
- a serializing means for passing a selectable pixel of each partial data line into a serial data stream, the serializing means being operatively connected with the first and second FIFO memory means to receive parallel format partial data lines therefrom;
- a clocking means for clocking each one of the FIFO memory means to read out the n partial data lines cyclically, after every nth partial data line is read out, one of the clocking means and the clocked FIFO memory means indexing the serializing means to pass a different pixel of each of the next n clocked out partial data lines.

12. The system as set forth in claim 11 wherein the first and second FIFO memory means each includes an array of FIFO memories, each FIFO memory being loaded with n partial line segments, the clocking means clocking a first FIFO memory of the array until all pixels of the n partial line segments have been serialized and then sequentially clocking each subsequent FIFO memory of the array.

13. A method of serializing raster image data with N raster lines which are sequentially and repeatedly read out of an image memory means to produce a raster type display, the method comprising:
a) intercepting and loading an m×n bit column of the image data into a first FIFO memory means from the raster lines of image data that are repeatedly read out of the image memory means while concurrently reading out rows of data from a second FIFO memory means previously loaded with an m×N bit column of data which was intercepted from the repeatedly read out raster lines, where m and n are plural integers;
b) reading out each of n rows of data from the second FIFO memory means;
c) passing a most significant bit of each of the n rows of data which are read out;
d) reading out each of the n rows of data again;
e) passing only a next less significant bit for the next n rows which are read out;
f) repeating steps (d) and (e) m times.

14. The method as set forth in claim 13 further including after the mth least significant bit has been read out of the second FIFO memory means, concurrently reloading the second FIFO memory means with another m×n bit column of data and serializing the data previously loaded into the first FIFO memory means.

15. The method as set forth in claim 14 further including after the mth least significant bit has been read out of the first FIFO memory array, concurrently reloading the first FIFO memory array with another m×n bit column of data and serializing the data previously loaded into the second FIFO memory means.

16. The method as set forth in claim 14 wherein n equals N.

17. A method of rotating and serializing raster image data which is read out of an image memory means without altering a raster storage format within the image memory means, the method comprising:
a) parallel loading a preselected plurality of data line portions from the image memory means into FIFO memories of a first FIFO memory array;
b) cyclically clocking a first FIFO memory of the first FIFO memory array to read out of first segments of each of the preselected plurality of data line portions;
c) passing a selected pixel position of each read out data line portion segment to a serial output;
d) repeating steps (b) and (c) for each pixel position of the data line portion first segment;
e) repeating steps (b)-(d) with data line portions from the image memory means for each subsequent FIFO memory of the first FIFO memory array;
f) concurrently with steps (b)-(e), parallel loading subsequent data line portions from the image memory means into FIFO memories of a second FIFO memory array.

18. The method as set forth in claim 17 further including repeating steps (b)-(d) for the FIFO memories of the second FIFO array concurrently with loading the preselected plurality of more data line portions into the first FIFO memory array.

* * * * *